(12) United States Patent
Furuhjelm

(10) Patent No.: US 10,148,499 B2
(45) Date of Patent: Dec. 4, 2018

(54) VERIFYING DISTRIBUTED COMPUTING RESULTS VIA NODES CONFIGURED ACCORDING TO A TREE STRUCTURE

(71) Applicant: Seagate Technology LLC, Cupertino, CA (US)

(72) Inventor: Martin R. Furuhjelm, Hamilton, MT (US)

(73) Assignee: Seagate Technology LLC, Cupertino, CA (US)

(*) Notice: Subject to any disclaimer, the term of this patent is extended or adjusted under 35 U.S.C. 154(b) by 204 days.

(21) Appl. No.: 15/347,093

(22) Filed: Nov. 9, 2016

(65) Prior Publication Data
US 2018/0131564 A1   May 10, 2018

(51) Int. Cl.
*H04L 12/24* (2006.01)
*H04L 29/08* (2006.01)

(52) U.S. Cl.
CPC .......... *H04L 41/0806* (2013.01); *H04L 67/34* (2013.01)

(58) Field of Classification Search
CPC .................... H04L 41/0806; H04L 67/34
See application file for complete search history.

(56) References Cited

U.S. PATENT DOCUMENTS

| | | | |
|---|---|---|---|
| 5,086,495 A | * | 2/1992 | Gray ...................... G06T 17/20 345/420 |
| 7,082,474 B1 | | 7/2006 | Hubbard |
| 7,454,411 B2 | | 11/2008 | Birdwell et al. |
| 9,195,939 B1 | * | 11/2015 | Goyal ...................... G06N 5/02 |
| 2016/0034551 A1 | * | 2/2016 | Huang .............. G06F 17/30584 707/756 |
| 2016/0283540 A1 | * | 9/2016 | Barber .............. G06F 17/30359 |
| 2016/0371330 A1 | * | 12/2016 | Weyerhaeuser .. G06F 17/30466 |
| 2017/0180939 A1 | * | 6/2017 | Kulkarni .................. H01Q 1/24 |
| 2017/0261958 A1 | * | 9/2017 | Jordan ............... G05B 19/0425 |
| 2017/0329809 A1 | * | 11/2017 | Nishimura ........ G06F 17/30598 |

* cited by examiner

*Primary Examiner* — Edan Orgad
*Assistant Examiner* — Nourali Mansoury
(74) *Attorney, Agent, or Firm* — Hollingsworth Davis, LLC

(57) ABSTRACT

Computing nodes are coupled via a network to communicate as a tree structure that performs a distributed computation. The nodes include a root node, intermediate nodes, and leaf nodes. At least some of the nodes obtain redundant results that are communicated together with a final result to the root node. The root node compares the redundant results to the final result to verify the final result.

15 Claims, 10 Drawing Sheets

VERIFYING DISTRIBUTED COMPUTING RESULTS VIA NODES CONFIGURED ACCORDING TO A TREE STRUCTURE

SUMMARY

The present disclosure is directed to verifying distributed computing results via nodes configured as a tree structure. In one embodiment, configuration data is prepared that defines interconnections between a plurality of computing nodes according to a tree structure. The tree structure includes a root node, and lower-level nodes. At least two branches of the tree structure perform redundant computations of a distributed computation performed on a data set. The configuration data and the data set is sent to the root node. In response to receiving the configuration data at the root node, the configuration data and first parts of the data set are sent from the root node to selected lower-level nodes defined in the configuration. The configuration data and the first parts of the data set propagate through the tree structure until the plurality of computing nodes are configured and have a local portion of the data set. In response to configuring the plurality of computing nodes, the distributed computation is performed at each of the lower-level nodes using the local portions of the data set. Partial results of the distributed computation are propagated from each of the lower-level nodes to the root node. The root node combines the partial results into first and second results corresponding to the redundant computations. The first and second results are compared to verify the distributed computation.

In another embodiment, computing nodes are coupled via a network to communicate as a tree structure that performs a distributed computation. A root node of the tree structure is configured to perform a parent role. The parent role involves receiving and combining partial results from two or more child nodes. The root node further is configured to form a final result based on the combining of the partial results from the two or more child nodes. A plurality of leaf nodes of the tree structure are configured to perform a child role. The child role involves obtaining self-calculated partial results of the distributed computation. One or more layers of intermediate nodes of the tree structure are configured between the root node and the leaf nodes. Each of the intermediate are nodes configured to perform the parent role, the intermediate nodes further combining the partial results from the two or more child nodes to obtain combined partial results, the combined partial results being sent to a parent node. At least some of the nodes performing the child role obtain redundant results that are communicated together with the final result to the root node, the root node comparing the redundant result to the final result to verify the final result.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
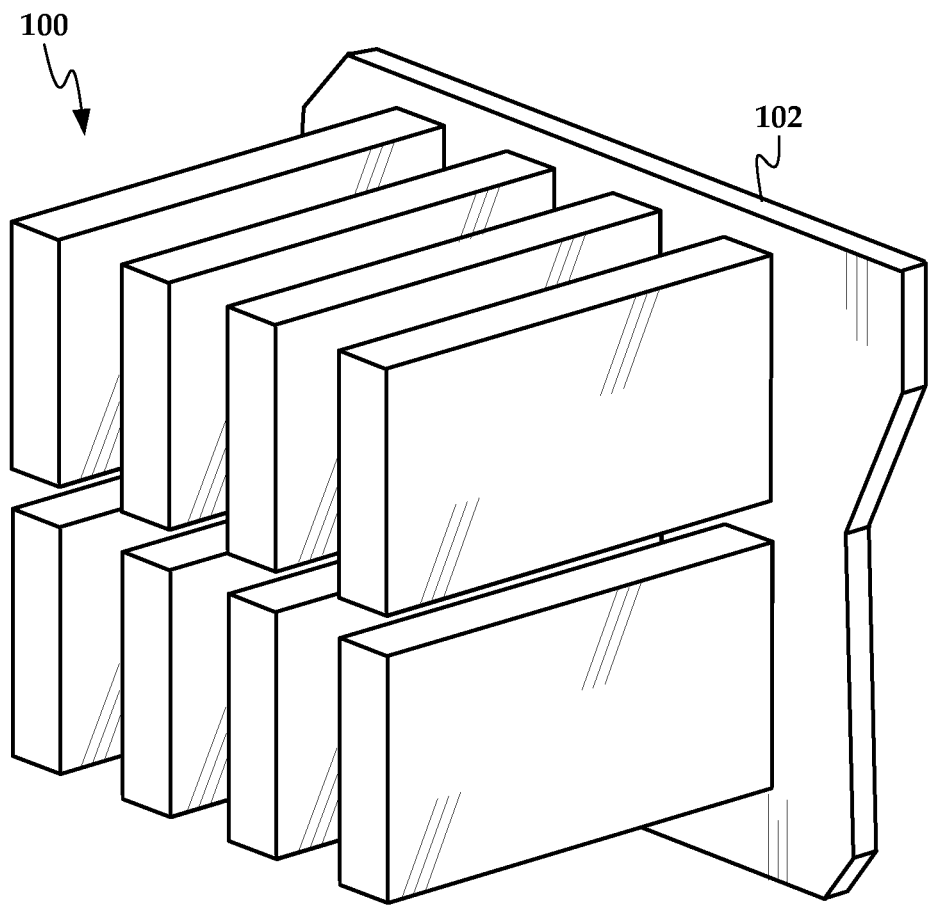
FIG. 1 is a perspective view of a storage compute array according to an example embodiment.

The present disclosure generally relates to distributed data processing used to solve large computation problems. In the early days of computers, high performance computing focused on creating ever more powerful standalone computers, e.g., supercomputers. Advances in technology have made fast networking and small, powerful computers widely available. As such, the task of solving large problems (and performing other large scale tasks) has increasingly shifted to parallel data processing using large networks of computers.

Generally, parallel data processing involves dividing a computational problem into independently solvable portions. These portions are distributed to compute nodes on a network. These compute nodes all have a compatible communication interface (e.g., message passing protocol) that facilitates the distribution of problems and solutions across the network. While each compute node on a parallel processing network may be less powerful than a mainframe or supercomputer, the combined processing power can rival that of supercomputers, and do so at significantly lower cost. Much of this lowering of cost is due to the availability of commodity computing and networking hardware.

Even though the computing power of an individual distributed compute node may be significantly less than a modern supercomputer, such nodes are nonetheless increasing in capability due to, for example, the ability to manufacture ever more dense central processors, the increase in input/output (I/O) bus throughput, increase in memory speed, and increases in persistent storage speed. Nonetheless, the I/O links between different components (e.g., networking, local data busses, memory busses) are seen as a bottleneck in reaching theoretical performance for some types of computational problems.

In the present disclosure, a distributed computing system is described that may utilize what are referred to as 'storage compute' devices. A storage compute system according to an example embodiment shown in the perspective view of FIG. 1. An array 100 of storage compute devices is shown coupled to a backplane 102. The storage compute devices 100 appear both physically and logically as storage drives, e.g., hard disk drives, solid state drives, etc. For example, the storage compute devices 100 may have a conventional drive physical form factor and connect to the backplane 102 via legacy storage device connectors. The storage compute devices 100 may communicate using industry standard storage device protocols, such as SATA, SaS, SCSI, USB, PCI, etc. Such protocols may be adapted to communicate over networks, such as via Ethernet, Fibre Channel, etc. A number of these systems 100, 102 may be coupled together via local or wide-area networks.

What differentiates the storage compute devices 100 from conventional drives is that they are capable of performing computations unrelated to the storage of data. For example, the industry standard protocols (e.g., SATA) may be adapted to pass data and operands to the devices 100 for purposes of performing a computation on the data. The devices 100 can return the result to the calling device, e.g., a host computer with which the storage devices 100 are associated.

For some sorts of computations, such as operations performed on large data sets such as matrices, a conventional computer spends an inordinate amount of time moving data between persistent storage, through internal I/O busses, through the processor and volatile memory (e.g., RAM), and back to the persistent storage. Generally, the persistent storage has orders of magnitude greater capacity than RAM and is much cheaper per unit of storage. However, because the data sets worked on are so large, the entire data set cannot fit in RAM, and so a large amount of system resources are dedicated to shuttling data between the CPU and persistent storage.

In the storage compute system, a tradeoff is made between processor power and the reduction of host-to-peripheral I/O. Instead of having a host CPU perform a large computation, the data is divided amongst devices in the array 100 and each storage compute device performs the smaller portions of the computations internally. While the storage compute devices 100 may not have nearly the computation power of a modern desktop CPU (e.g., x86 architecture), performance can still be improved in cases where the amounts of data are so large that they cannot be fully stored in system RAM and so would require significant swapping between the host CPU and persistent storage.

Figure 2:
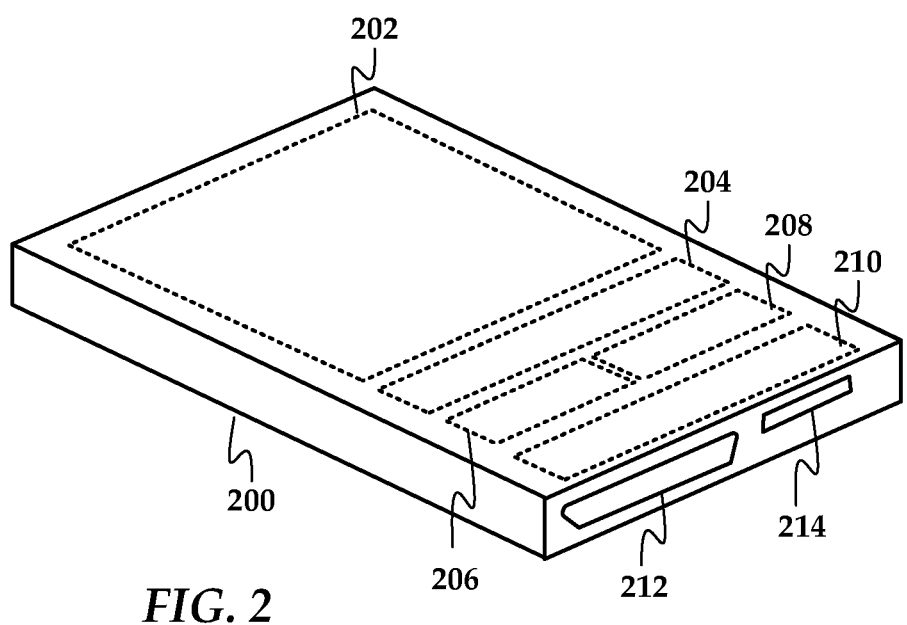
FIG. 2 is a perspective view of a storage compute device according to an example embodiment.

In FIG. 2, a perspective view shows a storage compute device 200 according to an example embodiment. The storage compute device 200 includes a persistent storage media 202, which may include any combination of magnetic disks and non-volatile, solid-state, memory. A memory interface 204 includes circuitry that controls access to the storage media 202, such as read and write channels, error correction, analog-to-digital converters, digital-to-analog converters, address selection, etc.

The storage compute device 200 includes two functional modules 206, 208 which may provide different functionality, although may share the same processing hardware. A legacy functional module 206 provides conventional storage support, e.g., processing host commands directed to loading, storing, and verifying data on the storage media 202. The legacy functional module 206 may conform to a particular command set and protocol, e.g., SATA storage protocol.

A compute module 208 provides host-directed computations on data stored in the storage media 202. For example, the host could load data sets onto the storage media 202 as streams files either via the legacy functional module 206 or via a custom command processed via the compute module 208. As an example of the former, the legacy functional module could have a reserved range of logical block addresses that are used for loading and storing data and commands, and that do not correspond to a physical address in the storage media 202. The host can similarly load via one or both modules 206, 208 metadata describing the data sets and computations to be performed on the data sets.

A host interface 210 includes circuits that facilitate host-to-device communications. The host interface 210 could be configured for local bus communications (e.g., SATA, PCI, USB) or remote bus communications (e.g., Ethernet, Fibre Channel). The host interface 210 may also include connectors 212, 214 that conform to the appropriate host-to-device communications standard used by the device 200. While not shown, the storage compute device 200 may also include industry standard mechanical interface features, such as mounting holes at predefined locations, standard-size case, etc.

The storage compute devices as shown in FIGS. 1 and 2 can be used as nodes for distributed computing. A distributed processing network generally includes a client that starts processes on connected nodes. These connected processes eventually complete their processing and return a result to the client. The client then reduces these results into a final answer. In a network with a relatively small number on processing nodes, each returning a relatively small intermediate result, this model works well and has been used in practice for many years. In order to increase performance in such nodes, the nodes have become more expensive, e.g., maximizing RAM, CPU, network, and storage capability and bandwidth.

As the network grows into thousands, and eventually millions of nodes, it may not be practical to continue to use the model described above, e.g., using a central client that directly branches to all of the computing nodes. As a result, the present disclosure provides optional network configurations more suitable for a larger network. This larger network can use less powerful nodes. For example, nodes may have 1 GB memory, use a low-power, dual core 1 GHZ processor (e.g., ARM architecture), and use a single spindle magnetic disk for storage. In order to efficiently transfer data across the network the nodes may use one or two 2.5 Gbps network interfaces.

Figure 3:
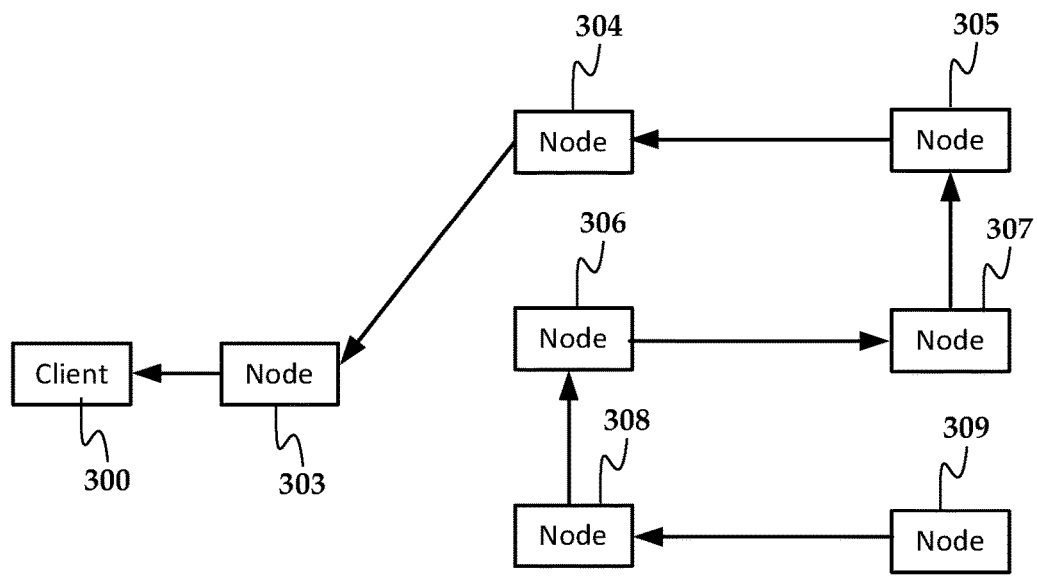
FIGS. 3 and 4 are a block diagrams of distributed computation networks according to example embodiments.
Figure 4:
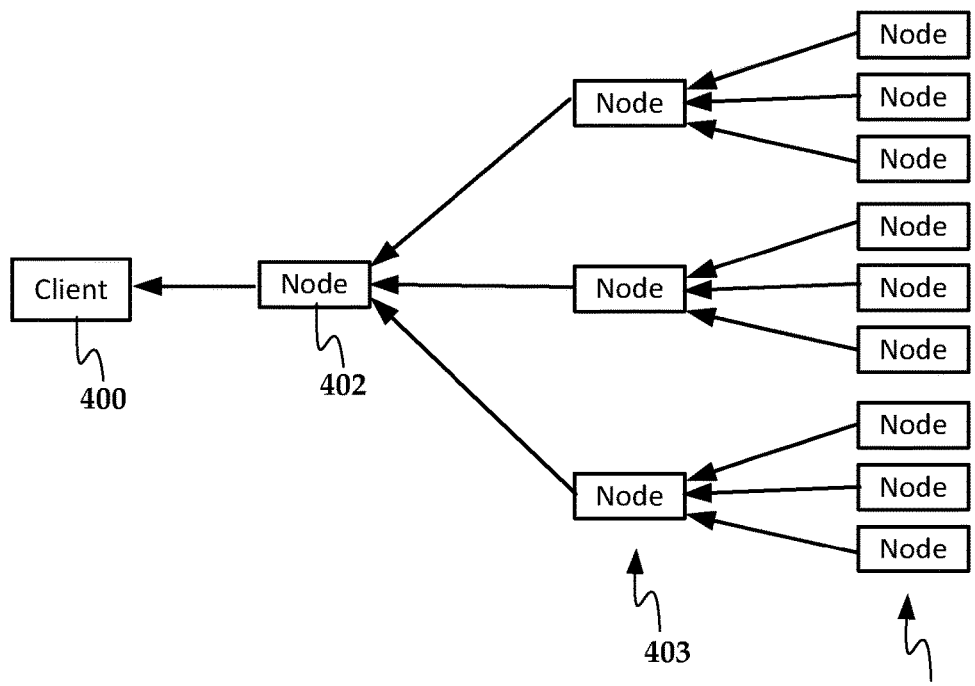

In node arrangements described below, each node except leaf nodes manages a small subset of the total nodes. The root node is at the top of the structure, and it is itself controlled/accessed by the client. There does not need to be a central metadata repository, e.g., the client and parent nodes can exchange metadata with each other. This reduces the amount of data flowing to the root node or other centralized entities. In FIGS. 3 and 4, diagrams show distributed computing architectures according to example embodiments.

In FIG. 3, a single distributed reduce scheme is shown. A client 300 directs a distributed solution via a top-level, root node 303. Intermediate nodes 304-309 are connected between the root node 303 and a bottom-level, leaf node 309. Note that the lines between nodes 303-309 indicate virtual connections, and the nodes 303-309 may be connected to common switching element, e.g., a layer-3 Ethernet switch. Since each node 303-309 connects to at most two other nodes, the number of layer 3 network links can be reduced and the traffic handled by individual network interfaces of the nodes 303-309 is minimized.

Generally, the client 300 and/or root node 303 may divide up the solution into parts that can be solved individually. The parts are distributed to the nodes 303-309 along the links, opposite the directions indicated by the arrows. Each node 303-309 processes its part of the operation, and the results are returned along the direction indicated by the arrows between nodes 303-309. Each node 303-309 combines its solution with that of its child node, and sends the aggregated result to its parent node. The root node 303 performs the final aggregation/combination, and the final result is then delivered to the client 300. This distributed processing minimizes the instantaneous network load, and can eliminate the processing requirements on the originating client 300.

In FIG. 4, a multiple distributed reduce scheme is shown. A client 400 directs a distributed solution via a top-level, root node 402. Intermediate nodes 403 are connected between the root node 402 and, bottom-level, leaf nodes 404. Note that the lines between nodes 402-404 indicate virtual connections. In this example, each node 402-404 connects to at most four other nodes (one parent and three children), which is more than in FIG. 3. If each node 402, 404 has two network interfaces, the load can be divided evenly, e.g., two links per network interface device.

The definition of the reduce schemes in FIGS. 3 and 4, e.g., the arrangement of parents and children can be pre-defined in either a central or distributed database. For example, each node could use a hardware identifier as a key to a database that defines its parents and child nodes. In another scheme, the parent calculates (at run-time) the address of its children based on an algorithm embedded in the program. Different algorithms can then create different tree structures. The parent nodes could initiate connections to children. Intermediate nodes with both parents and children would be ready once they have a) received a connection request from their parent and established this connection and b) initiated and established connections to the children. The root node would only need condition b) to occur and leaf nodes would only need condition a) to occur.

In one embodiment, the definition of the nodes could be placed in a data structure prepared by the root node. The data structure could be arranged as stack or linked list (in the case of the arrangement in FIG. 3) or a tree (in the case of the arrangement in FIG. 3). From the data structure, the root node determines its children and initiates a connection to them. The root node passes the data structure to the child nodes, which in turn find their location in the data structure (e.g., based on a hardware identifier, IP address, etc.) and initiates the connections defined for them in the data structure. This process repeats for each node until the data structure reaches the leaf nodes.

In a distributed reduce arrangement such as shown in FIG. 4, processes can be started in parallel on each layer of the tree. While this figure shows three children per node, any number of children can be used. For multiple child processes per node, there can be exponential process initiation by increasing the number of children per node. For example, in a network with 1,000,000 nodes where all the nodes are individually addressed by the client (a "traditional" network), if it takes 0.01 seconds to start a process on a node, then it would take about 3 hours to start the process on all nodes (0.01 s×1,000,000 nodes=10,000 seconds=166.67 minutes=2.78 hours). If the network were configured as a tree structured network with 32 children per node, then it would require 32×0.01 s for the first 32 nodes to start, 32×0.01 s for the next 1024 nodes to start, another 32×0.01 s for the next level of 32,768 nodes, then 32×0.01 s for the final 1,048,576 nodes. The total time for (more than) a million nodes to start therefore would be 32×4×0.01 s or about 1.28 seconds—almost 8,000 times faster. Process count is limited only by available node addresses. Network congestion can be reduced by configuring immediate child processes on the same local switch.

At completion, a single result set is sent to client 400. If each reduce operation in a 1 M node network produces 1 GB of results (for example a map of 2 TB of data), then a non-distributed reduce would have to receive (and reduce) 1 EB of data. The distributed reduce network with 32 children per node would reduce a maximum of 32 GB of data per node. Overall there would be slightly more data transferred across the network: 1 EB+32 TB+1 TB, but the data transfer would be distributed over time, instead of occurring at the final reduce operation.

An example of how a distributed reduce may be performed involves search through a large data set. For example, assume a data set includes data on individuals such as name, social security number, birthdate, address, etc. Also assume that one distributed operation is to determine from the data set the number of births by month, e.g., how many were born in January, February, etc. For each record, a compute node would read the record, extract the date of birth and convert at least the month to a common format (e.g., integer from 0 to 11), and increment a month count element in an array. For example, if the extracted value from one record is 2 (March), the array monthArray of size 12 would be incremented as follows in C or Java: monthArray[2]++. When done, the array is returned to the parent node.

In order to perform the above computation in a distributed system, the data set is split into equal subsets and copied to the child nodes, then, starting at the root node, a command is sent to each child node. Each child node sends the command to its child nodes. If a node has no child nodes, the command is performed locally on the local data set. The node reads the data set, extract the records, and calculates result. When done with the local data set, the node waits for and incorporates child node results, assuming there are any child nodes. Using the example given above, the merge can be accomplished as follows in C or Java: for(int j=0; j<numChildren; j++){for (int i=0; i<12; i++){myMonthArray[i]+=childMonthArray[j][i];}}. The merged results are returned to the parent node. If there is no parent node, it is the root node and so the final result can be presented to the client.

Figure 5A:
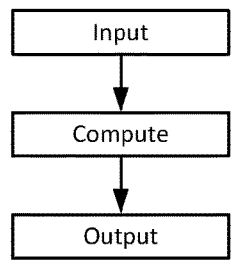
FIGS. 5A-D are block diagrams showing distribution of computations according to an example embodiment.
Figure 5B:
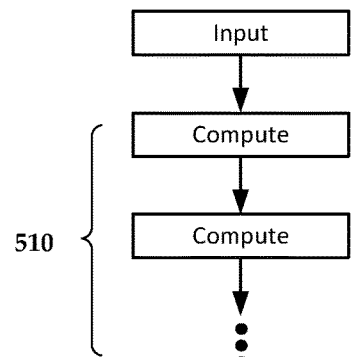
Figure 5C:
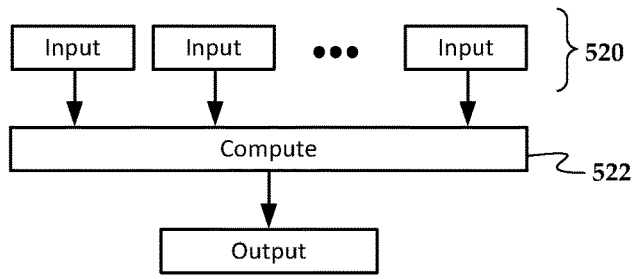
Figure 5D:
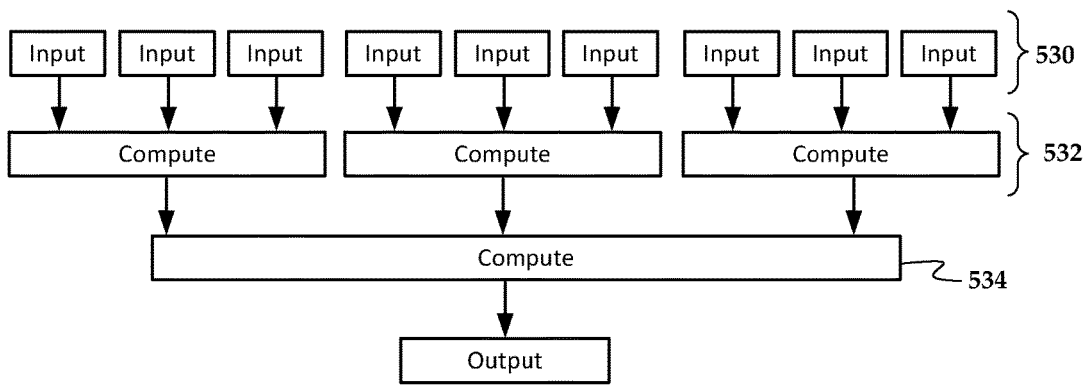

Each node in the example may divide its own part of the distributed computation and communicate the reduced results upward within the network back to the root node. In FIGS. 5A-D, a block diagrams show distributed reduce within a network according to an example embodiment. In FIG. 5A, a single sequential process is shown, which is how an individual node may process computations. In FIG. 5B, a sequential process with multiple compute nodes 510 is shown. For example, each node 510 may have a pipe taking input (e.g., partial results) from one pipe, reducing the results, and sending output to another node via another pipe. In FIG. 5C, a distributed reduce is shown, with multiple inputs 520 fed in parallel to a compute node 522 that reduces the data. In FIG. 5D, an arrangement shows multiple, parallel inputs 530 with parallel intermediate compute nodes 532 that feed into a final compute node 534. This arrangement can be seen as a combination of the concepts shown in FIGS. 5B and 5C.

In the distributed processing systems described above, each processing node will accept a process to run with input from (local) data, it will pass this process request down to other nodes, its "children", as specified in a local database (e.g., a file, key, or other data structure). Each of the children, will then also accept the process, and pass it down to additional children until, finally, at the end of the tree, no further child nodes are defined, and no further processes will be started. In one embodiment, the intermediate nodes only perform "merge" operations, all the data in on the terminal (leaf) nodes managing the "map" operation. This can be useful in a system where the links between the nodes is with point-to-point connections. Then the intermediate nodes can be manufactured without a storage component, reducing the cost of the intermediate nodes, and hence the overall cost of the system.

There are a number of benefits in managing distributed processes as described above. There is no central database needed, and no central management, as each node manages the nodes that it knows of (the "children"). The startup of the processes is exponential instead of linear. Once the first node has started the process on its first child, that child proceeds to start processes on its children, and so on, thus overlapping the start of processing. If each node has two children then the number of processes started will double with each branch, e.g., the first two nodes will start simultaneously, then four, eight, sixteen and so forth. This can quickly reach the point where thousands of processes will start at the same time. For a one million node system, this could be done with 32 branches per node with a four-layer tree. The first node would start 32, the 32 nodes would each start 32 for 1,024 at the second layer, then 32,768 at the third, and then 1,048,576 at the fourth layer.

If processes can be remotely started a in a millisecond (1,000 processes started per second), then a tree structured distributed network processing model could start 1M processes in 32 ms+32 ms+32 ms+32 ms or just over 1 second, after which data transfer could commence. In contrast, a central management structure, such as Hadoop where the Namenode manages both the file system and tracks the processes on each node, is limited to around 4,000 nodes due to the amount of physical memory needed on the Namenode and the amount of time needed for various overhead operations (e.g., Java garbage collection).

In a distributed processing network there may be multiple copies of the data to protect against data loss. For example, Hadoop networks generally have a replication factor of three, where each block of data has two copies. In a tree structured processing network data redundancy can be implemented where there are two (or more) copies of the data. If the network is organized in the same type of tree structure described above, and the trees are connected to the same root node, then two (or more) redundant processing requests can be started, each on its own tree branch. When the results are returned to the root, the results are compared and if they differ, the results declared invalid and/or accept a majority of identical results as likely or valid result.

Figure 6:
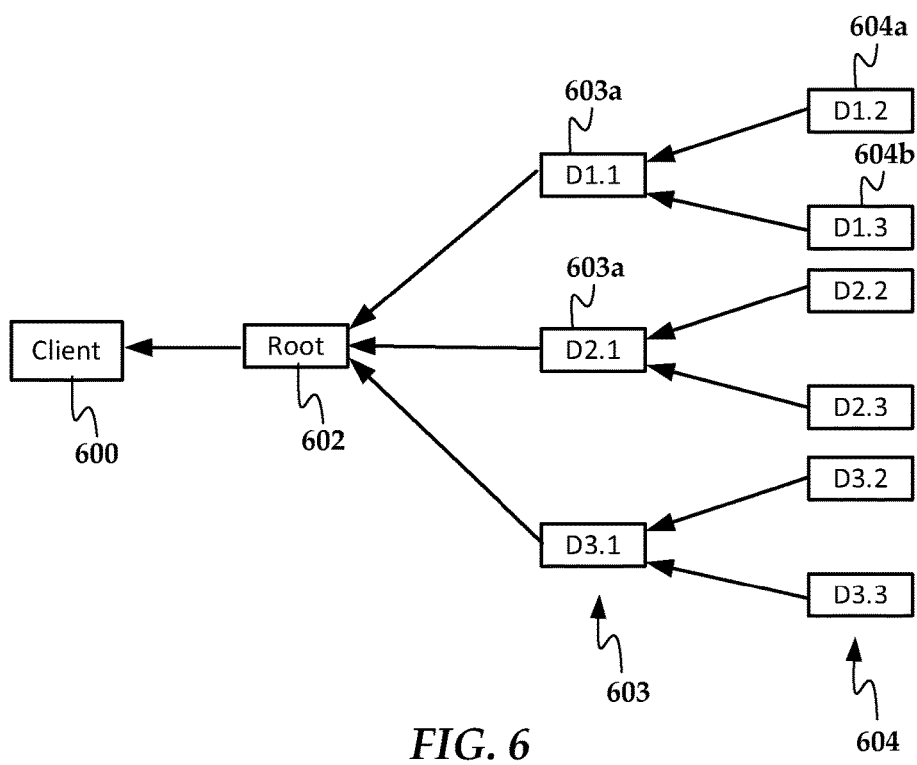
FIG. 6 is a block diagram showing a redundant computation being performed on a distributed computation network according to an example embodiment.

In FIG. 6, a block diagram illustrates a distributed processing network that provides replication/validation of results according to an example embodiment. A client 600 directs a distributed solution via a top-level, root node 602. Intermediate nodes 603 are connected between the root node 602 and, bottom-level, leaf nodes 604. The intermediate nodes 603 are branches that process three redundant copies D1, D2 and D3 of the same data set. The intermediate nodes 603 process their own portions D1.1, D2.1 and D3.1 of the copies. The leaf nodes 604 that branch from the same parent node 603 than process their own portions of the data set. For example, leaf nodes 604*a-b* are processing the portions D1.2 and D1.3 of data set D1 that have been provided by parent node 603*a*, which is itself processing data set portion D1.1.

In this example, the root node 602 compares the results from the D1, D2, and D3 branches to verify the distributed computation. If the results match, the client 600 receives the results. If all three results don't match, the client 600 decides the next steps. This could involve declaring the results invalid. In other case, the client 600 could see if two of the results match, and declare the two matching results as being the most likely to correspond to the correct solution.

In the embodiments described herein, individual nodes can utilize different architectures and platforms from one another. This is known as a heterogeneous computer network. For example, nodes may utilize different processor families (e.g., ARM, x86), different CPU word sizes (e.g., 32-bit, 64-bit), operating systems (e.g., Linux, Windows, VxWorks), motherboard chipsets, peripheral devices, etc. The existence of common network standards (e.g., TCP/IP) allows heterogeneous nodes to communicate with one another even though the nodes might not be able to run the same executables.

A heterogeneous network can be advantageous in cases such as shown in FIG. 6, where duplicate calculations are performed at different branches of a tree. If one architecture produces an error due, e.g., to a defect in the hardware or software of the architecture, such errors would not likely be repeated in a node with a different computing architecture. Heterogeneous networks can also be cost-effective, allow system designers and maintainers to select the lowest cost hardware and software that suits their needs and can free them from the risks of being locked into a single-vendor.

Use of different architectures can be a challenge when distributing the software to large numbers of nodes. One option is to create a "virtual machine", like Java, or other interpreted byte codes that run on the new architecture. There is additional overhead in running on a virtual machine, and the application may not be optimized for the new (and improved) features, so even though it would work, there may be a better solution. Such a solution does not involve running in a virtual machine or require modifications to the operating system kernel to determine which version of the binary code to run.

In a heterogeneous network, nodes may have different software and/or hardware architecture. If a computation (e.g. Map/Reduce) is to be run on a node, it may be run in a virtual environment (e.g. Hadoop/Java), or built to run on the architecture of a particular node. The latter can be done by building the application on each architecture, and copying it to the nodes of that architecture in the network prior to executing the application. This pre-staging of the application, however, might involve using a central management system that can copy the appropriate version ("binary executable") of the application to the correct node, and that can also make sure that each node has the correct version as nodes are added to and removed from the network.

One solution described below removes the requirement of a central management system. Instead, the application is compiled for each architecture on the network, an archive of all the applications is created. When the application is to be run in the network, the archive is copied to the target node, e.g., from parent to child node. The architecture of the target node is determined and the appropriate binary executable is extracted from the archive. This binary is the one executed on the target node.

If there are child nodes below the target node, it can then copy the same archive to the child node(s), determine the architecture, extract and run, etc. The distributed application itself (e.g., the one performing the distributed computation) can be distributed using this method. When a node receives a command from its parent, it will copy the current archive to the child node(s). The node can determine the architecture of the child node, e.g., using "ssh" and "uname -m" in a Unix or Linux environment. Next, the node can remotely execute a "tar xf" command to extract the correct binary, and then cause the child node to execute that binary. While the child node can determine its own architecture and perform the other steps, having the parent perform these operations fits in well with the architectures described above where the parent manages the children. This may streamline error reporting and other system management operations.

Figure 7:
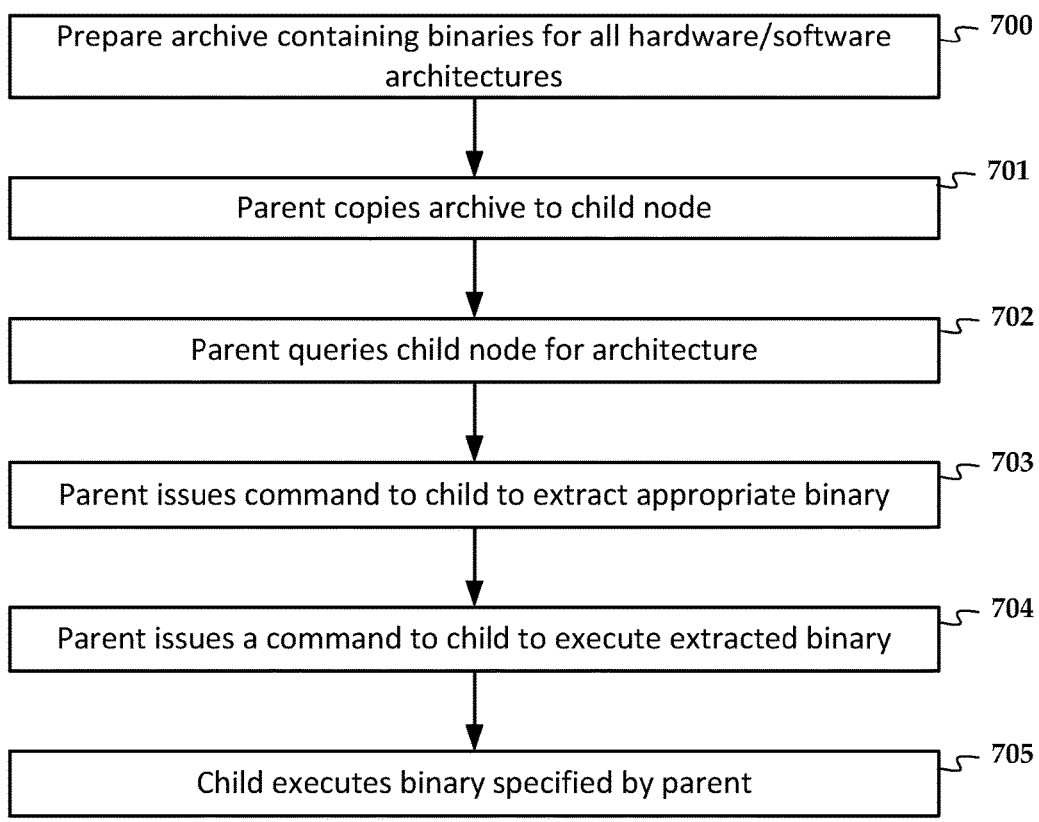
FIGS. 7 and 8 are flowcharts of methods according to example embodiments.

In FIG. 7, a flowchart illustrates a method for executing a distributed process according to an example embodiment. An archive containing binaries for all hardware/software architectures is prepared 700. This can be done using a command such as "tar -cf app_archive binaries/*'". The parent copies 701 binary copied to child node, e.g., "scp app_archive.tar child1". The parent queries 702 child for architecture, e.g., 'ssh child1 "uname -m"' (child1 returns "x86_64"). The parent issues 703 a command to extract the appropriate binary, e.g., 'ssh child1 "tar -xf app_archive.tar app.x86_64" '. The parent issues the command 704 to the child to run the extracted binary, e.g., 'ssh child1 "./app.x86_64"'. Finally, the child executes 705 the binary specified by the parent The above example above describes a Linux ssh TCP/IP implementation of the method shown in FIG. 7. The process can alternatively be implemented using a client/server communication protocol other than ssh with TCP/IP. For example, network protocols such as Web services, remote procedure calls, or custom protocols can be used to achieve a similar result. In other embodiments, there could be a server application that communicates directly with a client, and implements the archive extraction/command execution without TCP/IP or other networking functionality (e.g., direct MAC addressing or USB connection, or wireless (e.g., Bluetooth, ZigBee, Z-wave, etc.)

In some embodiments, a distributed computing system may include features to adapt to the number of cores available in the computing nodes. For example, the GNU 'parallel' command allows the operator to specify the number of cores to use when executing on a local (or remote) node. In a networked system the nodes may include systems with different architecture. Some nodes may have a single core processor, others may have dual cores, quad cores etc. When an application is run on a particular node, it may be compiled for a particular architecture but not be optimized for the number of cores available in the node. In some embodiments, computing nodes can individually determine the number of cores available to the application. In response, the nodes can partition the data into an equal number of equal size partitions, and run the application on multiple cores with a partition of the data set. This can be done using a tool such as GNU parallel, and in addition by manually specifying the number of cores, and how to partition the data on a local system.

Figure 8:
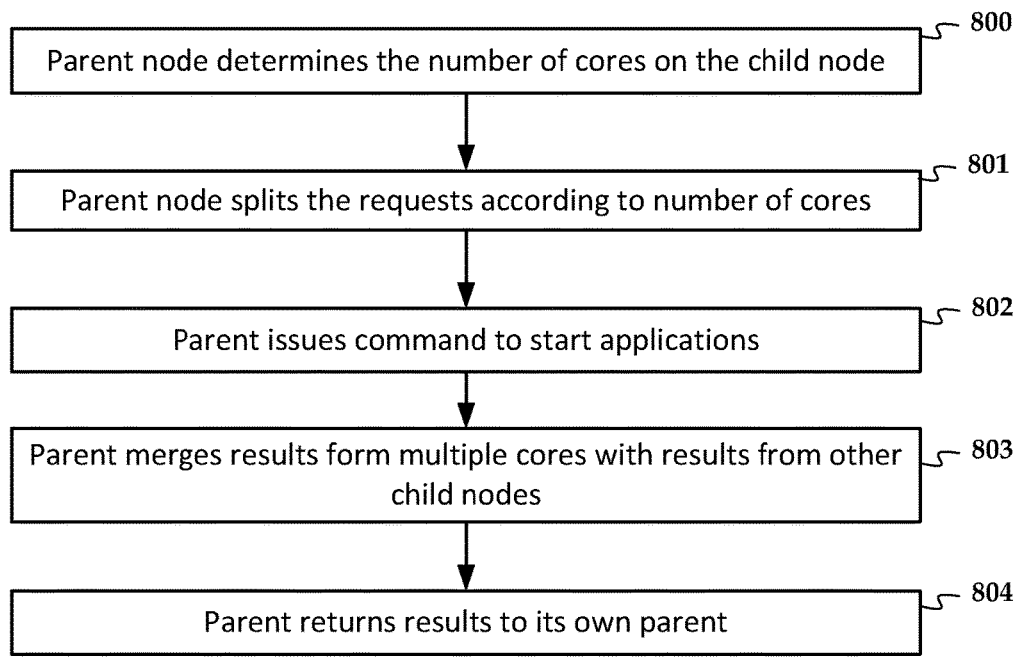

In FIG. 8, a flowchart shows a method of starting processes on a child node according to an example embodiment. A parent node determines 800 the number of cores on the child node, e.g., "ssh child1 nproc" to which the child returns "4". The parent node splits 801 the requests according to number of cores and issues 802 command to start applications. This can be done in a loop, e.g., for each core, file_size=size/4, ssh child1 "./app file (offset=core#*file_size, size=file_size)". The parent merges 803 results from multiple cores with results from other child nodes, and returns 804 results to its parent, or to the client if this is the root node.

Figure 9:
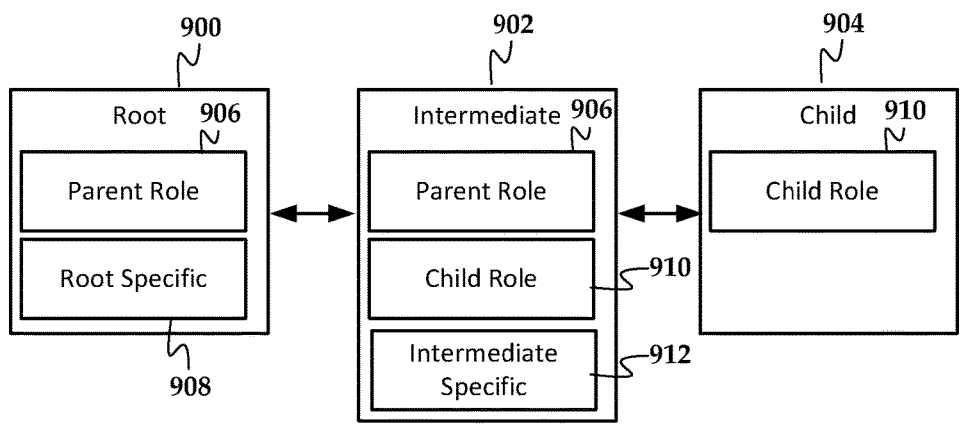
FIG. 9 is a block diagram of node roles according to an example embodiment.

Although the distributed computing system describe above may utilize a large number of nodes, e.g., thousands, most of the nodes will be performing the same task, namely performing part of the distributed computation. The nodes will also perform other tasks relating to managing the computation, such as delivering data sets and results, distributing executables to perform parts of the distributed computation, etc. In FIG. 9, a diagram illustrates how some of these functions can be defined and distributed according to an example embodiment.

The networks described herein at least include one root node 900, one or more layers of intermediate nodes 902, and a leaf node 904. The root node 900 is configured to perform a parent role 906. The parent role 906 at least involves receiving and combining partial results from two or more child nodes. The child nodes may be a leaf node 904 or other intermediate nodes 902 on a different layer. The root node 906 also has a root-specific role 908, which involves forming a final result based on the combining of the partial results from its two or more child nodes.

The intermediate nodes 902, having both parent and child nodes, can perform the parent role 906 and a child role 910. The child role 910 involves obtaining self-calculated partial results of the distributed computation. This is the only role assigned to the leaf nodes 904. The intermediate nodes may also perform intermediate specific operations that include combining the partial results from the two or more child nodes with the self-calculated results to obtain combined partial result, the combined partial results being sent to a parent node. Note that, while not shown here, the root node 900 may optionally self-calculate part of the total solution, and may therefore also perform the child role 910. Configured this way, the root node 900 would also combine the partial results from the two or more child nodes with the self-calculated results to obtain the final result. If the network is configured where intermediate nodes do not work on partial data sets, then the intermediate nodes would also not perform the child role 910.

In some configurations, the parent role 906 may further involve receiving at least part of a data set, the distributed computation being collectively performed on the data set. For the root node 900, the full data set may be received from a client and for intermediate nodes the data set (or a portion thereof) may be received from a parent node. The parent role 906 in such a case may further involve dividing the at least part of the data set into portion and send the portions to the two or more child nodes to obtain the partial results.

In other configurations, the parent role 906 may further involve querying the two or more children to determine a number of compute cores of the two or more children. In response, the role 906 involves instructing the two or more children to divide the portions of the data set based on the number of compute cores and to independently process the divided portions of the data set on the respective compute cores.

In other configurations, the parent role 906 may further involve sending one or more binary executables to the two or more child nodes. The one or more binary executables are used by the two or more child nodes in performing the respective parts of the distributed computation. The one or more binary executables may be contained in an archive, in which case the parent role 906 may further involve querying the two or more children to determine respective architectures of the two or more children, and instructing the children to extract and execute a first selected binary executable from the archive corresponding to the respective architecture.

Figure 10:
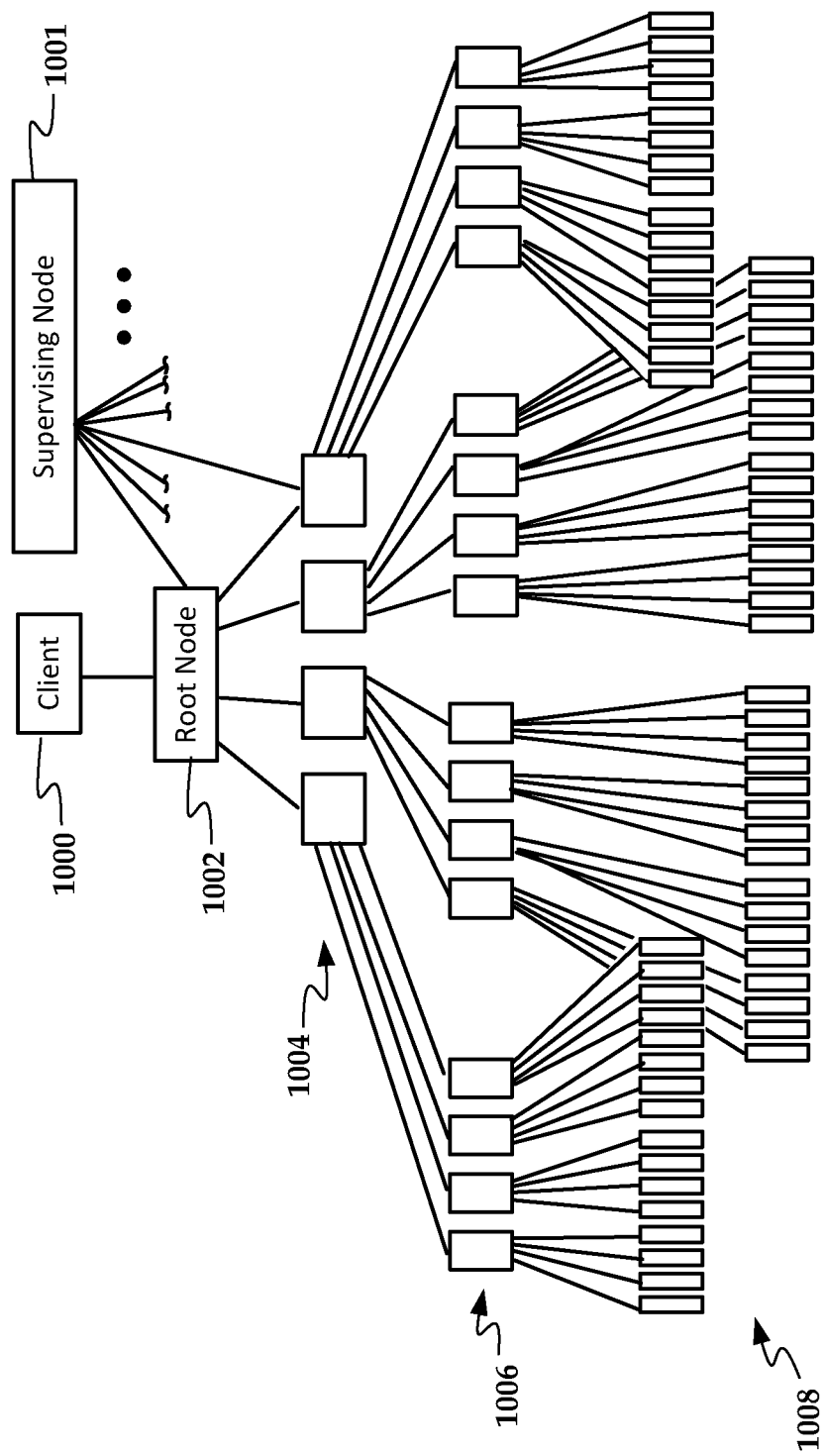
FIG. 10 is a diagram showing distribution of data sets in a distributed computation network according to an example embodiment.

As noted above, a distributed solution may involve a data set that is divided between nodes which perform calculations on their portion of the data set, which has been referred to as a partial solution. In FIG. 10, a block diagram shows how data may be divided to perform a distributed network according to an example embodiment. The network includes a client 1000, a root node 1002, a first layer 1004 of four intermediate nodes, a second layer 1006 of 16 intermediate nodes, and a third layer 1008 of 64 leaf nodes. This results in 84 intermediate and leaf nodes. The number and arrangement of nodes will be known beforehand, e.g., by the client 1000, and data that defines the tree structure of this network will be propagated among the nodes (e.g., from parent to child) as described elsewhere herein.

Because the number of nodes involved in the solution is known beforehand, the division of the data set can also be known. For example, assume the distributed computation involves operating on a 1 GB data set. Because there are 84 nodes processing this set, each node will take $\frac{1}{84}^{th}$ of the total solution, or 1000 MB/84=11.9 MB for a 1 GB data set. The root node 1002 can divide the 1 GB into four equal 250 MB parts, and distribute these parts to the first layer nodes 1004. Each of these nodes will take $\frac{1}{84}^{th}$ of the total solution for self-processing and distribute the remaining amount to nodes at layer 1006. The remaining amount for each node at this layer 1004 is 250 MB−11.9 MB=238.1 MB. This remaining amount will be divided into four 59.5 MB portions, and sent to each of the four child nodes in layer 1006. This will repeat for each node, until each node receives 11.9 MB of data for processing, resulting in the full 1 GB of data being processed by the 84 nodes.

When the number of nodes and their location (address) is known beforehand, the client 1000, or a supervising node 1001 can distribute the data directly to the root node 1002, the intermediate nodes 1004, 1006 and the leaf nodes 1008. Generally, the supervising node 1001 (or client 1000) can access each node of the network directly, and so the supervising node 1001 or client 1000 performs the splitting of the data and sends the local parts directly to the appropriate nodes. Each node would then receive a 11.9 MB portion of the total data set. The client 1000 can then request that the computation be performed on the data copied to the nodes. The supervising node 1001 can add data to the nodes in the network as it is generated outside the network and received by the supervising node 1001.

If the system shown in FIG. 10 is configured such that only the child nodes perform the distributed processing, then the 1 GB data set in the above example would be divided by the root node 1002 into four equal 250 MB parts that would be distributed between nodes of the first layer 1004. Each 250 MB part would then be divided into 62.5 MB parts that are each sent to nodes of the second layer 1106. Each 62.5 MB part would be divided into 15.6 MB parts that are sent to the leaf nodes 1008. This division of the data into 15.6 MB could alternatively be performed by the client 1000 or supervisory node 1001 and sent directly to each leaf node 1008. Note that compared to the case where intermediate nodes 1004, 1006 perform partial computation, the leaf nodes in this example will process about 31% more data. This places more computational load on the leaf nodes 1008, but may have other advantages, e.g., allows for reduced-cost intermediate nodes.

While the above embodiments show tree structures with equal numbers of child nodes per parent, other embodiments may include different number of children per parent. For example, if some network communication devices are faster than other, the nodes using these devices may support more children per node than other devices. Similarly, if the client or other organizing entity knows beforehand (e.g., via a network-wide query) that certain nodes (e.g., sub-trees or individual nodes) have significantly larger processing power, the division of the data per node may be made uneven to more evenly utilize the processing power. For example, if in an 84 node network, 20 of the nodes are known to have at least twice the processing power of the other 64 nodes, the data set may be divided into 84+20=104 portions. The 20 more-powerful nodes would process $\frac{1}{52}$ of the total data set and the other nodes would process $\frac{1}{104}$ of the data set. The capability of the node could be determined by the parent, e.g., using the "uname" or "nproc" commands as described above when determining if a child node is one of the 20 more-powerful nodes.

Figure 11:
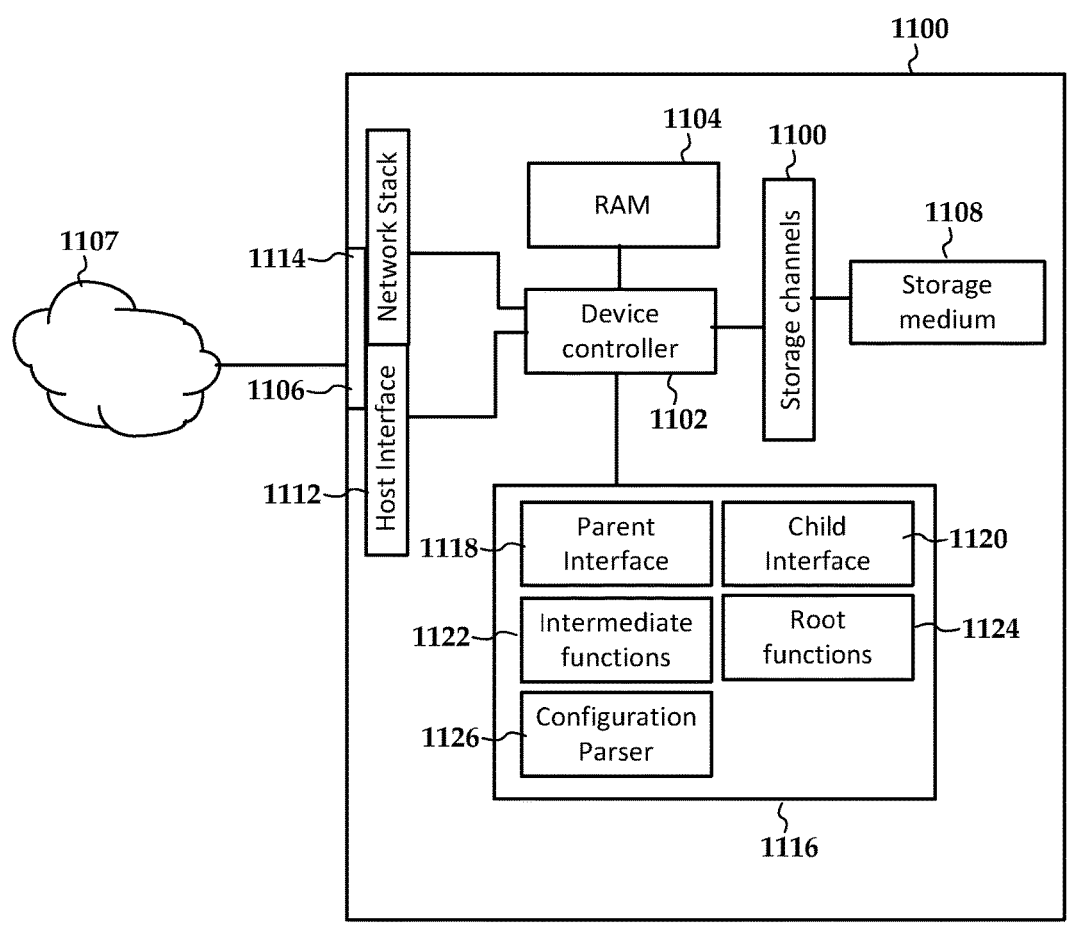
FIG. 11 is a block diagram of an apparatus according to an example embodiment.

In FIG. 11, a block diagram shows an apparatus 1100 according to an example embodiment. This apparatus 1100 may be configured as a storage compute device as described above. The apparatus 1100 includes a device controller 1102 that may at least include a central processing unit. The device controller 1102 may be a system on a chip (SoC), in which case it may include other functionality in a single package together with the processor, e.g., memory controller, network interface 1106, digital signal processing, etc. Memory 1104 is coupled to the device controller 1102 and is configured to store data and instructions as known in the art. The network interface 1106 includes circuitry, firmware, and software that allows communicating via a network 1107, which may include a wide-area and/or local-area network.

If the apparatus 1100 is a storage compute device, it will include a storage medium 1108 accessible via storage channel circuitry 1110. The storage medium 1108 may include non-volatile storage media such as magnetic disk, flash memory, resistive memory, etc. The device controller 1102 in such a case can process legacy storage commands (e.g., load, store, verify) via a host interface 1112 that operates via the network interface 1106. The host interface 1112 may utilize custom storage protocols and/or standard network protocols, represented by network stack 1114. For example, the network stack 1114 may provide a standardized interface for communicating via TCP/IP, UDP/IP and other lower or higher level network protocols.

The apparatus 1100 includes a portion of volatile and/or non-volatile memory that stores computer instructions 1116. These instructions may include various modules that allow the apparatus 1100 to operate as any node in a distributed processing network as described above. For example, parent interface 1118 and child interface 1120 modules allow the apparatus to assume the parent and/or child roles as described above. Functions specific to intermediate nodes and the root node may be handled via modules 1122, 1124. A configuration parser 1126 enables reading network configuration data that may define, among other things, node roles, parent-child relationships between nodes, division of data set, binary executables used in the solution, etc.

Figure 12:
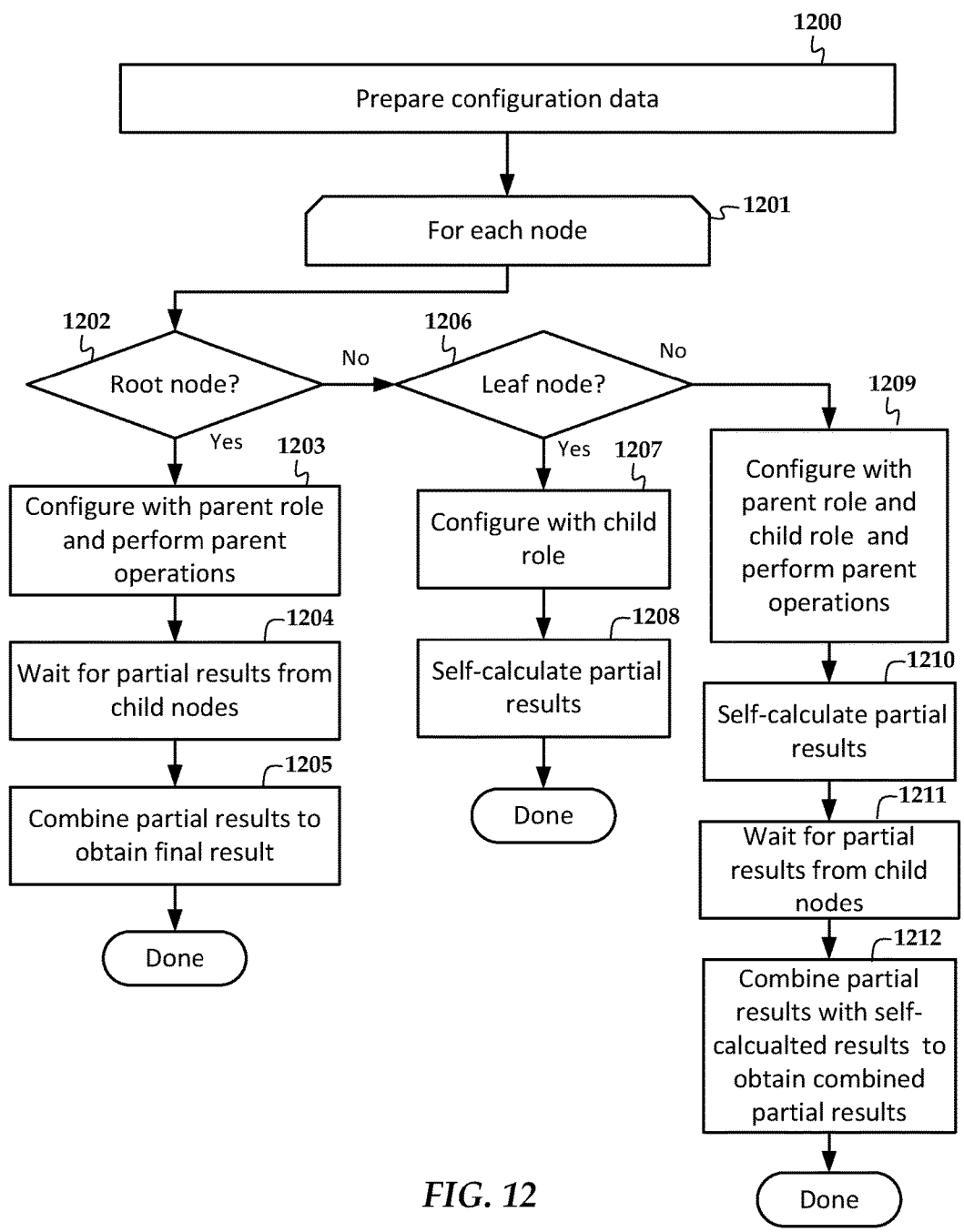
FIGS. 12 and 13 are flowcharts of methods according to example embodiments.

In FIG. 12, a flowchart shows a method according to an example embodiment. The method involves configuring 1200 configuration data that at least defines the roles and structures of a plurality of computing nodes coupled via a network to communicate as a tree structure that performs a distributed computation. The configuration data may be passed through the tree structure from top to bottom, e.g., from a root node to leaf nodes. Each of the nodes is individually configured as indicated by block 1201. Note that block 1201 is not necessarily a loop limit on a single device, but is a point that is entered after configuring, e.g., a parent node, which involves initiating actions on its child nodes that are defined in the configuration.

If it is determined at block 1202 that the current node is the root node of the tree structure, then the node is configured 1203 to perform a parent role. The parent role involves at least receiving and combining partial results from two or more child nodes, and may also involve other actions described above (e.g., remotely accessing child nodes and initiating operations on the child nodes). The root node is further configured to wait 1204 for partial results from its child nodes, and form a final result based on the combining 1205 of the partial results from the two or more child nodes. This completes the entire distributed computation.

If it is determined at block 1206 that the node is a leaf node, the node is configured 1207 to perform a child role. The child role at least involves self-calculating 1208 partial results of the distributed computation. If blocks 1202 and 1206 return no, then the current node is an intermediate node of the tree structure. The intermediate node is configured 1209 to perform the parent and child roles, as well as perform parent operations (e.g., remotely accessing child nodes and initiating operations on the child nodes). The child operations include self-calculating partial results 1210. The intermediate node is further configured to wait 1211 for partial results from the two or more child nodes and to combine 1212 the partial results with the self-calculated results to obtain combined partial results.

Figure 13:
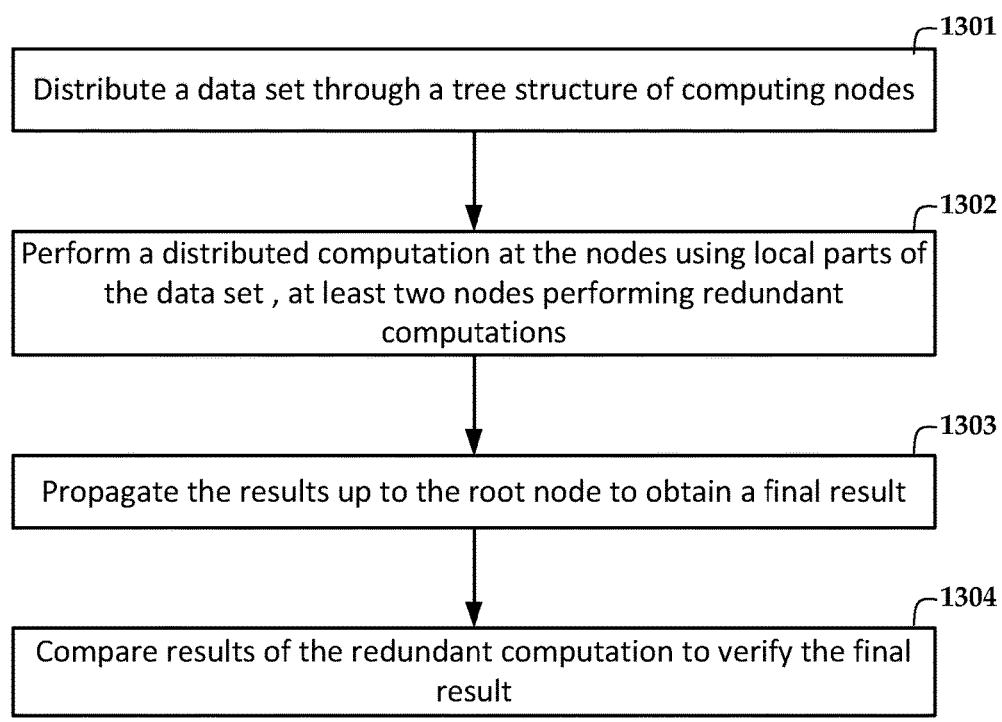

In FIG. 13, a flowchart shows a method according to an example embodiment. The method is performed by computing nodes coupled together to communicate as a tree structure. The data set is distributed 1301 through the tree structure. A distributed computation is performed 1302 at the computing nodes using local parts of the data set. At least two nodes perform redundant computations. Results are propagated 1303 up to the root node to obtain a final result. The results of the redundant computations are compared 1304 to verify the final result.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
preparing configuration data that defines interconnections between a plurality of computing nodes according to a tree structure, the tree structure comprising a root node, and lower-level nodes, at least two branches of the tree structure performing redundant computations of a distributed computation performed on a data set;
sending the configuration data and the data set to the root node;
in response to receiving the configuration data at the root node, sending the configuration data and first parts of the data set from the root node to selected lower-level nodes defined in the configuration, the configuration data and the first parts of the data set distributed via the tree structure until the plurality of computing nodes are configured and have a local portion of the data set;
in response to configuring the plurality of computing nodes, performing the distributed computation at each of the lower-level nodes using the local portions of the data set;
for each of the plurality of nodes that is configured as a parent node, performing:
querying child nodes to determine a number of compute cores of the two or more child nodes:
instructing the child nodes to divide the local portions of the first parts of the data set based on the number of compute cores; and
instructing the child nodes to independently process the divided local portions of the data set on the respective compute cores;
propagating partial results of the distributed computation from each of the lower-level nodes to the root node, the root node combining the partial results into first and second results corresponding to the redundant computations;
comparing the first and second results to verify a final result of the distributed computation; and
delivering the final result to a client that directed the distributed computation.

2. The method of claim 1, wherein for each of the plurality of nodes that is configured as a parent node, sending one or more binary executables to two or more child nodes, the one or more binary executables used by the two or more child nodes in performing the respective parts of the distributed computation.

3. The method of claim 2, wherein the one or more binary executables are contained in an archive, the parent node further querying the two or more child nodes to determine respective architectures of the two or more child nodes; and instructing the two or more child nodes to extract and execute a first selected binary executable from the archive corresponding to the respective architecture.

4. A system comprising:
a plurality of processors coupled as nodes via a network to communicate as a tree structure that performs a distributed computation, the tree structure comprising:
a root node that receives and combines partial results from two or more leaf nodes, the root node further configured to form a final result based on the combining of the partial results from the leaf nodes, the leaf nodes obtaining self-calculated partial results of the distributed computation;
one or more layers of intermediate nodes coupled between the root node and the leaf nodes, each of the intermediate nodes configured to perform a parent role, the intermediate nodes further configured to combine the partial results from the two or more leaf nodes to obtain combined partial result, the combined partial results being sent to a parent node; and
the parent role comprising:
receiving at least part of a data set, the distributed computation being collectively performed on the data set;
dividing the at least part of the data set into portions; and
sending the portions to the two or more leaf nodes to obtain the partial results;
querying the two or more child nodes to determine a number of compute cores of the two or more child nodes;

instructing the two or more child nodes to divide the portions of the data set based on the number of compute cores; and instructing the two or more child nodes to independently process the divided portions of the data set on the respective compute cores; and at least some of the leaf nodes obtaining redundant results that are communicated together with the final result to the root node, the root node comparing the redundant result to the final result to verify the final result and sending the final result to a client.

5. The system of claim 4, wherein the parent role further comprises sending one or more binary executables to the two or more child nodes, the one or more binary executables used by the two or more child nodes in performing the respective parts of the distributed computation.

6. The system of claim 5, wherein the one or more binary executables are contained in an archive, the parent role further comprising:

querying the two or more child nodes to determine respective architectures of the two or more child nodes; and instructing the child nodes to extract and execute a first selected binary executable from the archive corresponding to the respective architecture.

7. The system of claim 4, wherein the intermediate nodes and leaf nodes comprise storage compute devices.

8. The system of claim 4, wherein the intermediate nodes are further configured to perform the child role, the intermediate nodes combining the partial results from the two or more child nodes with the self-calculated results to obtain the combined partial results.

9. The system of claim 4, wherein the configuring of the root and leaf nodes is performed via configuration data that is passed through the tree structure from the root node to the leaf nodes.

10. A method, comprising:

coupling a plurality of computing nodes via a network to communicate as a tree structure that performs a distributed computation;

configuring a root node of the tree structure to perform a parent role, the parent role comprising:

receiving at least part of a data set, the distributed computation being collectively performed on the data set;

dividing the at least part of the data set into portions;

sending the portions to two or more child nodes to obtain the partial results;

querying the two or more child nodes to determine a number of compute cores of the two or more child nodes;

instructing the two or more child nodes to divide the portions of the data set based on the number of compute cores;

instructing the two or more child nodes to independently process the divided portions of the data set on the respective compute cores; and receiving and combining partial results from the two or more child nodes, the root node further configured to form a final result based on the combining of the partial results from the two or more child nodes;

configuring a plurality of leaf nodes of the tree structure to perform a child role, the child role comprising obtaining self-calculated partial results of the distributed computation;

configuring one or more layers of intermediate nodes of the tree structure between the root node and the leaf nodes to perform the parent role, the intermediate nodes further combining the partial results from the two or more child nodes to obtain combined partial results, the combined partial results being sent to a parent node, at least some of the nodes performing the child role obtaining redundant results that are communicated together with the final result to the root node, the root node comparing the redundant result to the final result to verify the final result; and delivering the final result to a client that directed the distributed computation.

11. The method of claim 10, wherein the parent role further comprises sending one or more binary executables to the two or more child nodes, the one or more binary executables used by the two or more child nodes in performing the respective parts of the distributed computation.

12. The method of claim 11, wherein the one or more binary executables are contained in an archive, the parent role further comprising:

querying the two or more child nodes to determine respective architectures of the two or more child nodes; and instructing the child nodes to extract and execute a first selected binary executable from the archive corresponding to the respective architecture.

13. The method of claim 10, wherein the intermediate nodes and leaf nodes comprise storage compute devices.

14. The method of claim 10, wherein the configuring of the root, intermediate, and leaf nodes is performed via configuration data that is passed through the tree structure from the root node to the leaf nodes.

15. The method of claim 10, wherein the intermediate nodes are further configured to perform the child role, the intermediate nodes combining the partial results from the two or more child nodes with the self-calculated results to obtain the combined partial results.

* * * * *